United States Patent

Fujibayashi

(10) Patent No.: US 6,798,478 B2
(45) Date of Patent: Sep. 28, 2004

(54) LIQUID CRYSTAL DISPLAY APPARATUS AND METHOD OF MANUFACTURING THE SAME

(75) Inventor: Sadayasu Fujibayashi, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/133,365

(22) Filed: Apr. 29, 2002

(65) Prior Publication Data

US 2002/0167622 A1 Nov. 14, 2002

(30) Foreign Application Priority Data

May 9, 2001 (JP) ........................................ 2001-139090

(51) Int. Cl.⁷ ........................ G02F 1/1335; H01L 21/00
(52) U.S. Cl. ........................................ 349/113; 438/30
(58) Field of Search ............................ 349/113; 438/30

(56) References Cited

U.S. PATENT DOCUMENTS

| | | | | |
|---|---|---|---|---|
| 5,526,149 A | * | 6/1996 | Kanbe et al. | 349/113 |
| 5,946,065 A | * | 8/1999 | Tagusa et al. | 349/138 |
| 6,410,358 B1 | * | 6/2002 | Noritake et al. | 438/29 |
| 6,452,653 B1 | * | 9/2002 | Yamanaka et al. | 349/113 |

FOREIGN PATENT DOCUMENTS

JP 2000-258762 9/2000

OTHER PUBLICATIONS

Stanley Wolf, Ph.D., and Richard N. Tauber, Ph.D., Silicon Processing for the VLSI Era, 1986, vol. 1, pp. 418–420.*
Stanley Wolf, Ph.D., and Richard N. Tauber, Ph.D., Silicon Processing for the VLSI Era vol. 1: Process Technology, Lattice Press, pp. 418–419 (Copyright 1986). ISBN 0–961672–3–7.*

* cited by examiner

Primary Examiner—Robert H. Kim
Assistant Examiner—Jeanne Andrea Di Grazio
(74) Attorney, Agent, or Firm—Pillsbury Winthrop LLP

(57) ABSTRACT

In a method of manufacturing a liquid crystal display apparatus having a liquid crystal layer between a first substrate and a second substrate and having an uneven layer with an uneven shape on a liquid crystal layer side of the first substrate, the uneven layer is formed by a film-forming step of forming a photosensitive resin layer on the first substrate, a first exposure step of exposing the photosensitive resin layer through a mask having a predetermined pattern, a developing step of developing the photosensitive resin layer exposed in the first exposure step, a second exposure step of exposing an entirety of the developed photosensitive resin layer, and a heating step of heating the photosensitive resin exposed in the second exposure step.

4 Claims, 4 Drawing Sheets

|  | Process | Range of angles | Ratio of occurrence of non-uniform reflection |
|---|---|---|---|
| Embodiment | Exposure→development→post-exposure →post-baking | 28° | 0% |
| Comparative example 1 | Exposure→development→post-baking | 5° | 0% |
| Comparative example 2 | Exposure→development→melt-baking →post-baking | 27° | 40% |

FIG. 7

LIQUID CRYSTAL DISPLAY APPARATUS AND METHOD OF MANUFACTURING THE SAME

CROSS-REFERENCE TO RELATED APPLICATIONS

This application is based upon and claims the benefit of priority from the prior Japanese Patent Application No. 2001-139090, filed May 9, 2001, the entire contents of which are incorporated herein by reference.

BACKGROUND OF THE INVENTION

1. Field of the Invention

Recently, a liquid crystal display (LCD) apparatus has been put to practical use, which has a reflection display function of displaying an image by reflecting ambient light such as sunlight. In this type of LCD apparatus, in general cases, when an image is displayed by reflection light, the viewing angle is increased by scattering the reflection light. A reflection electrode provided in the LCD apparatus has unevenness on its surface in order to scatter reflection light.

2. Description of the Related Art

A prior-art LCD apparatus having such an uneven surface layer is disclosed in, e.g. Jpn. Pat. Appln. KOKAI Publication No. 2000-258762. According to the LCD apparatus of KOKAI No. 2000-258762, an array substrate has an uneven layer of insulating material as an underlayer of a reflection electrode. The reflection electrode has unevenness corresponding to the unevenness of this uneven layer.

The uneven layer is formed, for example, in the following manner. A positive type photosensitive resin is coated on a substrate. The photosensitive resin is exposed via a predetermined pattern mask, and is subjected to development. Thus, the photosensitive resin with an uneven shape is formed. Subsequently, the developed photosensitive resin is heated by so-called post-baking. Thereby, the photosensitive resin is melted to form the smooth unevenness and is solidified. An uneven layer is thus formed.

When the uneven layer is formed by the method of KOKAI No. 2000-258762, high-temperature heating is effected in solidifying the photosensitive resin. However, due to a steep rise in temperature at the post-baking, the photosensitive resin may excessively be melted. In such a case, it is difficult to form desired unevenness on the photosensitive resin. Consequently, it is disadvantageously difficult to increase the viewing angle in the LCD apparatus having a reflection display function.

BRIEF SUMMARY OF THE INVENTION

The present invention has been made in consideration of the above problems and its object is to provide a liquid crystal display apparatus and a method of manufacturing the same, which realize an increase in the viewing angle without causing non-uniform reflection.

According to a first aspect of the present invention, there is provided a method of manufacturing a liquid crystal display apparatus having a liquid crystal layer between a first substrate and a second substrate and having an uneven layer with an uneven shape on a liquid crystal layer side of the first substrate, wherein the uneven layer is formed by: a layer-forming step of forming a photosensitive resin layer on the first substrate; a first exposure step of exposing the photosensitive resin layer through a mask having a predetermined pattern; a developing step of developing the photosensitive resin layer exposed in the first exposure step; a second exposure step of exposing an entirety of the developed photosensitive resin layer; and a heating step of heating the photosensitive resin exposed in the second exposure step.

According to a second aspect of the present invention, there is provided a liquid crystal display apparatus having a liquid crystal layer between a first substrate and a second substrate, the first substrate having an uneven layer with an uneven shape on a liquid crystal layer side of the first substrate, wherein the uneven layer is formed by: a layer-forming step of forming a photosensitive resin layer on the first substrate; a first exposure step of exposing the photosensitive resin layer through a mask having a predetermined pattern; a developing step of developing the photosensitive resin layer exposed in the first exposure step; a second exposure step of exposing an entirety of the developed photosensitive resin layer; and a heating step of heating the photosensitive resin exposed in the second exposure step.

According to the liquid crystal display apparatus and the method of manufacturing the same, the entirety of the photosensitive resin is exposed in the second exposure step before the photosensitive resin is heated. Thus, the viscosity of the photosensitive resin at the time prior to heating increases. Therefore, excessive melting of the photosensitive resin can be suppressed even when the photosensitive resin is heated in the heating step.

Thus, an uneven shape to be created on the photosensitive resin can easily be controlled and the desired uneven shape can uniformly be formed in accordance with the predetermined pattern of the photomask. Moreover, since the uniform uneven shape can be created, the occurrence of non-uniform reflection can be suppressed and the viewing angle can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 shows measurement results of the range of angles and the percentage of occurrence of non-uniform reflection in liquid crystal display apparatuses according the embodiment of the invention, comparative example 1 and comparative example 2.

DETAILED DESCRIPTION OF THE INVENTION

A liquid crystal display (LCD) apparatus and a method of manufacturing the same according to embodiments of the present invention will now be described in detail with reference to the accompanying drawings.

Figure 1:
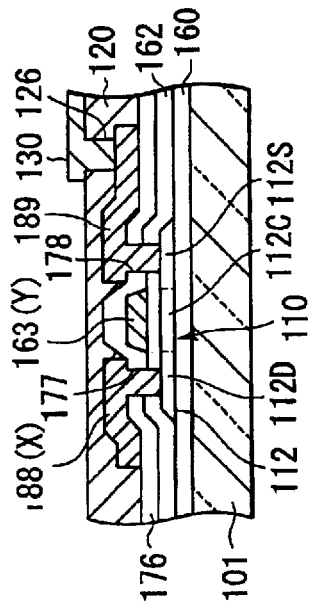
FIG. 1 schematically shows the structure of a liquid crystal display apparatus according to an embodiment of the present invention.

As is shown in FIG. 1, an LCD apparatus, e.g. an active-matrix reflection-type LCD apparatus, has an LCD panel 10. The LCD panel 10 comprises an array substrate 100 as a first substrate, a counter-substrate 200 as a second substrate disposed to face the array substrate 100, and a liquid crystal composition 300 constituting a liquid crystal layer disposed between the array substrate 100 and counter-substrate 200.

In the LCD panel 10, an image display region 102 is formed within a region defined by a seal member 106 that couples the array substrate 100 and counter-substrate 200.

In the display region 102, the array substrate 100 has pixel electrodes 130, scan lines Y, signal lines X, and thin-film transistors (TFT) 110 functioning as switching elements. An m×n number of pixel electrodes 130 are arranged in a matrix. The m-number of scan lines Y are arranged in the row direction of the pixel electrodes 130. The n-number of signal lines X intersect the scan lines Y and are arranged in the column direction of the pixel electrodes 130. The m×n number of thin-film transistors 110, that is, pixel TFTs 110, are arranged near the intersections of the scan lines Y and signal lines X in association with the m×n pixel electrodes 130.

In a peripheral region 104 surrounding the display region 102, the array substrate 100 has a scan line driving circuit 18 for supplying driving signals to the scan lines Y, and a signal line driving circuit 19 for supplying driving signals to the signal lines X.

Figure 2:
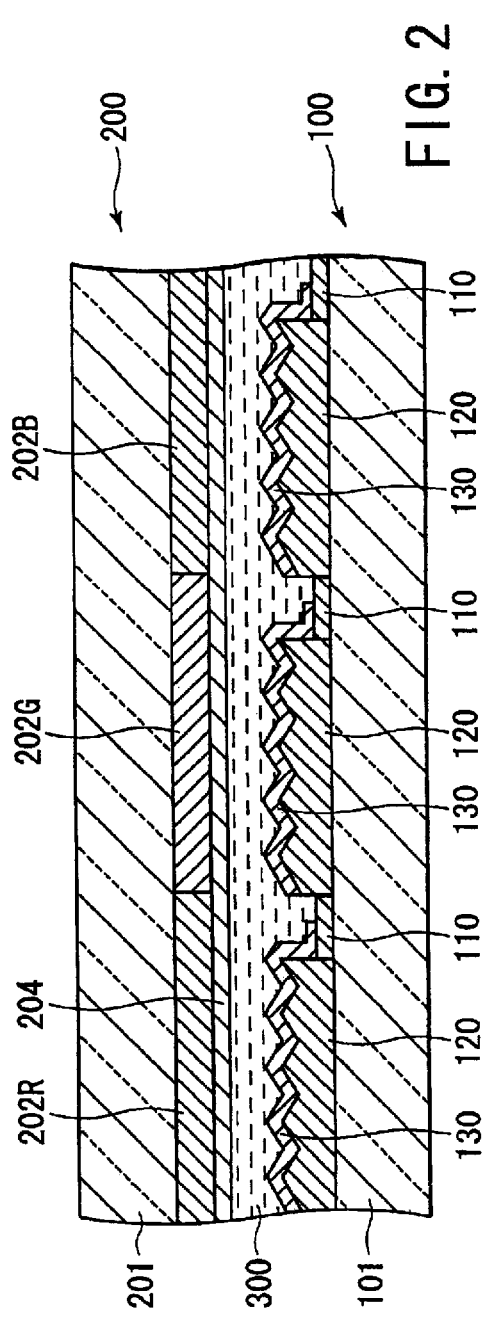
FIG. 2 schematically shows a cross-sectional structure of a liquid crystal display panel shown in FIG. 1.
Figure 3:
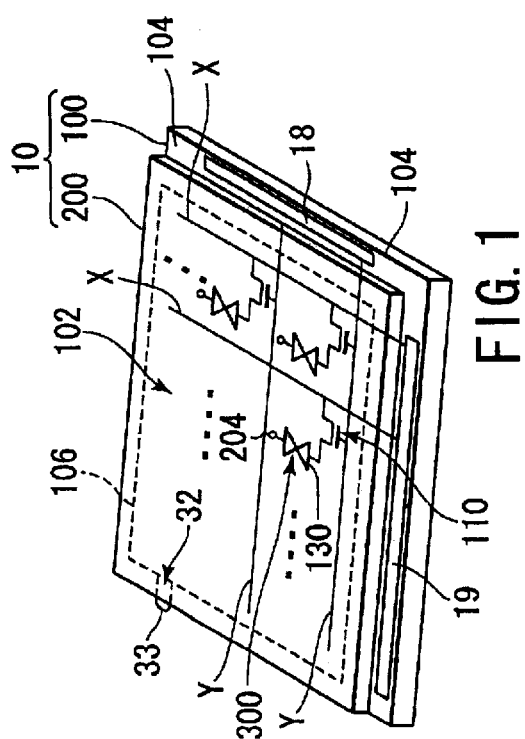
FIG. 3 schematically shows a cross-sectional structure of a switching element in an array substrate shown in FIG. 2.

As is shown in FIGS. 2 and 3, the array substrate 100 includes a transparent insulative substrate 101 such as a glass substrate. In the display region 102, TFTs 110, an insulating layer 120 and pixel electrodes 130 are provided on the insulative substrate 101. The pixel TFTs 110 are formed in association with pixels arranged in a matrix. The insulating layer 120 is formed to cover the display region 102 including the pixel TFTs 110. The pixel electrodes 130 are provided on the insulating layer 120 in association with the respective pixels.

The pixel TFTs 110 are individually connected to the scan lines Y formed in the row direction of pixel electrodes 130 and to the signal lines X formed in the column direction of pixel electrodes 130. Specifically, the pixel TFT 110 has a semiconductor layer 112 formed of a polysilicon film. The semiconductor layer 112 is disposed on an under-coating layer 160 provided on the glass substrate 101. The semiconductor layer 112 includes a channel region 112C, and a drain region 112D and a source region 112S formed on both sides of the channel region 112C by doping impurities.

The TFT 110 includes a gate electrode 163 that is integral with the associated scan line Y and disposed to be opposed to the semiconductor layer 112 via a gate insulating film 162. A drain electrode 188 of the pixel TFT 110 is formed integral with the associated signal line X and electrically connected to the drain region 112D of semiconductor layer 112 via a contact hole 177 penetrating the gate insulating film 162 and an interlayer insulating film 176. A source electrode 189 of the pixel TFT 110 is electrically connected to the source region 112S of semiconductor layer 112 via a contact hole 178 penetrating the gate insulating film 162 and interlayer insulating film 176.

The pixel electrodes 130 are formed of a metallic material, such as aluminum, silver or a silver alloy, which reflects ambient light incident via the liquid crystal layer 300. The pixel electrode 130 is connected to the source electrode 189 of pixel TFT 110 via a through-hole 126 penetrating the insulating layer 120.

Wiring portions such as signal lines X and scan lines Y are formed of a light-shielding low-resistance material such as aluminum or molybdenum-tungsten. In this embodiment, the scan lines Y and gate electrodes 163 are mainly formed of molybdenum-tungsten. On the other hand, the signal lines X, drain electrodes 188 and source electrodes 189 are mainly formed of aluminum.

The insulating layer 120 is formed of a positive type photosensitive resin such as a transparent resist. The insulating layer 120 is an underlayer of the pixel electrodes 130. The insulating layer 120 is an uneven layer having unevenness on its surface located on the liquid crystal layer 300 side. The pixel electrodes 130 disposed on the insulating layer 120 with such an uneven shape have unevenness corresponding to the uneven shape of the insulating layer 120.

The counter-substrate 200 includes a transparent insulative substrate 201 such as a glass substrate. In the display region 102, color filter layers 202 and a counter-electrode 204 are provided on the insulative substrate 201. The color filter layers 202 are arranged in association with the respective pixels of green (G), blue (B) and red (R). The color filter layers 202 (R, G, B) comprise three-color resin layers that pass light of green, blue and red color components, respectively. The counter-electrode 204 is formed of a light-transmissive electrically conductive member of ITO (Indium Tin Oxide), etc., which is disposed to face the entirety of the pixel electrodes 130 of the array substrate 100.

The LCD panel 10 comprises, where necessary, an alignment film disposed on the surface of the array substrate 100 to cover the pixel electrodes 130, an alignment film disposed on the surface of the counter-substrate 200 to cover the counter-electrodes 204, and a polarizing plate disposed on the back face of the counter-substrate 200.

In the reflection-type LCD apparatus as described above, ambient light such as sunlight incident from the counter-substrate 200 side passes through the glass substrate 201, color filter layers 202 and counter-electrode 204 of the counter-substrate 200 and enters the liquid crystal layer 300. The ambient light, while passing through the liquid crystal layer 300, is modulated by the liquid crystal composition that is controlled by a potential difference produced, as desired, between the pixel electrodes 130 and counter-electrode 204.

The ambient light emanating from the liquid crystal layer 300 is reflected by the pixel electrodes 130. The reflection light from the pixel electrodes 130, while passing through the liquid crystal layer 300 once again, is modulated as desired and is selectively let to go out of the counter-substrate 200. In this way, the ambient light is reflected to display an image. The reflection light is scattered by the uneven surfaces of the pixel electrodes 130. Thus, a greater viewing angle can be obtained with the LCD apparatus having this structure, compared to the case of using flat-surface pixel electrodes 130.

A method of manufacturing the LCD panel 10 will now be described.

To start with, in a step of manufacturing the array substrate 100, a silicon nitride film and a silicon oxide film are successively grown on a glass substrate 101 having a thickness of 0.7 mm. Thus, an under-coating layer 160 of a two-layer structure is formed.

An amorphous silicon film is formed on the undercoating layer 160. A laser beam is radiated on the amorphous silicon film to anneal the same. Thereby, the amorphous silicon film is made into a polycrystal. The polycrystalline silicon film, i.e. a polysilicon film, is patterned to form a semiconductor layer 112 of the TFT 110.

Subsequently, a silicon oxide film is formed on the entire surface of the structure, and a gate insulating film 162 is formed. A metallic film, such as a molybdenum-tungsten alloy film, is formed on the entire surface of the gate insulating film 162. The metallic film is patterned to have a predetermined shape. Thus, various wiring elements, such as scan lines Y and gate electrodes 163 integral with the scan liens Y are formed.

Using the gate electrode 163 as a mask, impurities are implanted in the semiconductor layer 112, thereby forming a drain region 112D and a source region 112S of the TFT 110. The whole substrate is annealed to activate the impurities.

A silicon oxide film is formed on the entire surface of the structure. Thus, an interlayer insulating film 176 is formed. Contact holes 177 and 178 are then formed. The contact hole 177 penetrates the gate insulating film 162 and interlayer insulating film 176 and reaches the drain region 112D. The contact hole 178 penetrates the gate insulating film 162 and interlayer insulating film 176 and reaches the source region 112S.

A metallic film, such as a molybdenum-aluminum lamination film, is formed on the entire surface of the interlayer insulating film 176. This metallic film is patterned to have a predetermined shape. Thereby, the signal line X, drain electrode 188 of TFT 110 integral with the signal line X, and source electrode 189 of TFT 110 are formed.

Subsequently, an insulating layer 120 serving as an uneven layer is formed on the substrate. A method of forming the insulating layer 120 will now be described in detail with reference to FIGS. 4A to 4E.

Figure 4A:
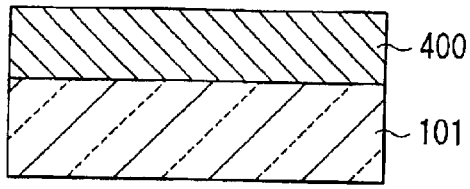
FIGS. 4A to 4E show steps of manufacturing an insulating layer in the liquid crystal display panel shown in FIG. 1.

In a step illustrate in FIG. 4A, a transparent or black ultraviolet-curing acrylic resin resist 400 is coated, as a photosensitive resin, on the entire surface of the substrate 101 by means of a spinner. For the purpose of simple descriptions, FIGS. 4A to 4E omit showing of detailed structures of the undercoating layer 160, etc.

Figure 4B:
Figure 4B:
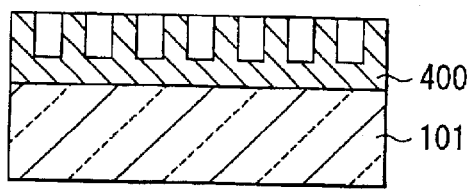

In a first exposure step illustrated in FIG. 4B, the resist film 400 is exposed via a photomask 410 having a predetermined pattern. For example, the resist film 400 is exposed with a wavelength of 365 nm and a low exposure amount of about 80 mJ/cm$^2$. In the employed positive-type photosensitive resin, the exposed portion undergoes an optical cross-linking reaction. Only the portion of the resin, where the optical cross-linking reaction has progressed, is dissolved and removed by a prechosen developer liquid. In the first exposure step, in order to obtain the uneven surface shape of the resist film 400, the exposure amount is set such that the optical cross-linking reaction may not progress down to the bottom of the resist film 400.

Figure 4C:
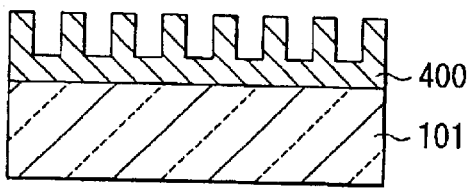

In a developing step illustrated in FIG. 4C, the resist film 400 exposed in the first exposure step is developed with a prechosen developer liquid, e.g. 0.7% aqueous solution of TMAH, for about 20 seconds, following which the whole structure is rinsed with water. In the developing step, only the portion of resist film 400, where the optical cross-linking reaction has progressed, is dissolved and removed by the developer liquid. Thereby, the resist film 400 is provided with an uneven surface shape, which has projections in the thickness direction thereof with such a height as not to expose the underlayer.

Figure 4D:
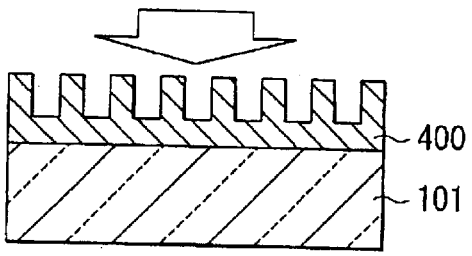

Subsequently, in a second exposure step (post-exposure) shown in FIG. 4D, the entirety of the developed resist film 400 is exposed. In this case, the resist film 400 is exposed with a greater exposure amount than in the first exposure step, e.g. about 500 mJ/cm$^2$ at a wavelength of 365 nm. Specifically, the positive-type photosensitive resin used in this embodiment is such properties that the optical cross-linking reaction progresses in the exposed portion, whereby the exposed portion has an increased viscosity to heat and becomes difficult to melt. In the second exposure step, the exposure amount is set such that the optical cross-linking reaction may progress throughout the resist film 400, thereby to prevent excessive melting when the resist film 400 is heated.

Figure 4E:
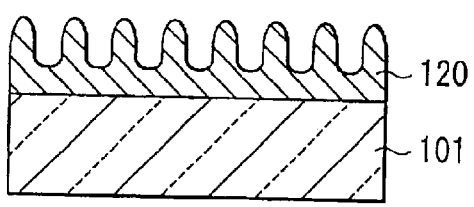

In a heating step (post-baking) illustrated in FIG. 4E, the resist film 400 exposed in the second exposure step is placed on a hot plate and heated at a high temperature, e.g. about 220° C. In this heating step, the resist film 400 is partly melted by heat to form a smooth uneven surface portion. In this case, since the entirety of the resist film 400 was exposed in the second exposure step, the uneven shape at the surface of the resist film 400 can easily be controlled and a desired uneven shape can be obtained uniformly over the entire resist film 400.

By the above process, the insulating layer 120 having the uneven surface shape is formed.

Following the formation of the insulating layer 120, a through-hole 126 for contact between the switching element 110 and pixel electrode 130 is made. Subsequently, an aluminum film is formed on the insulating layer 120. The aluminum film is then patterned to form a predetermined pixel pattern. Thereby, the pixel electrode 130 put in contact with the switching element 110 is formed. Thereafter, an alignment film material such as polyimide is coated on the entire surface of the structure. The alignment film material is baked to form an alignment film.

The array substrate 100 is thus formed.

On the other hand, in the steps of forming the counter-substrate 200, color filter layers 202 (R, G, B) are first formed on a glass substrate 201 having a thickness of 0.7 mm in association with red pixels, green pixels and blue pixels. An ITO film is formed on the color filter layers 202 as a counter-electrode 204. An alignment film material such as polyimide is coated on the entire surface of the structure. The alignment film material is baked to form an alignment film.

Thereby, the counter-substrate 200 is formed.

In the process of manufacturing the LCD panel 10, a seal member 106 is coated by printing on an outer peripheral portion of the array substrate 100 such that the liquid crystal containing space is surrounded except for a liquid crystal injection port 32. The array substrate 100 and counter-substrate 200 are disposed such that the alignment film of array substrate 100 may face the alignment film of counter-substrate 200. The seal member 106 is cured by heat and both substrates are bonded to each other. Then, a liquid crystal composition 300 is injected from the liquid crystal injection port 32, and the liquid crystal injection port 32 is sealed by a seal member 33.

The LCD panel 10 is manufactured by the above process.

According to the thus manufactured LCD apparatus, the surfaces of the pixel electrodes 130 are uniformly provided with an uneven shape. Therefore, when ambient light is reflected by the pixel electrodes 130, non-uniform reflection can be suppressed, and the viewing angle can be increased.

The LCD apparatus according to the above-described embodiment will now be compared with liquid crystal display apparatuses manufactured by other methods with respect to display performances.

Figure 5A:
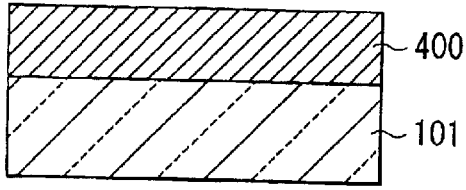
FIGS. 5A to 5D show steps of manufacturing an insulating layer in a liquid crystal display apparatus according to a comparative example 1.
Figure 5B:
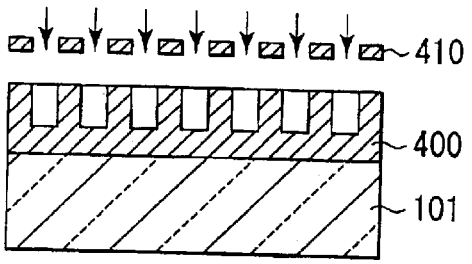
Figure 5C:
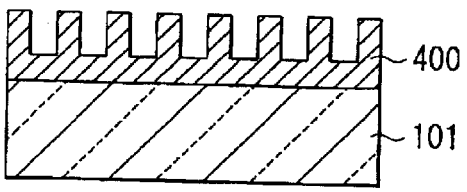
Figure 5D:
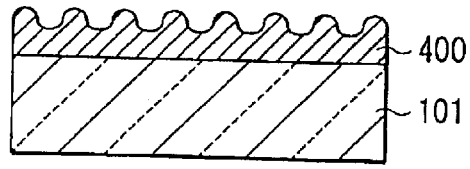

Comparative Example 1 is shown in FIGS. 5A to 5D. An LCD apparatus of Comparative Example 1 has an insulating layer 120 with an uneven shape, which is formed by the process comprising, in succession, a film-forming step, an exposure step, a developing step and a heating (post-baking) step. The steps in FIGS. 5A to 5C are identical to the steps in FIGS. 4A to 4C. The step in FIG. 5D is identical to the step in FIG. 4E.

Figure 6A:
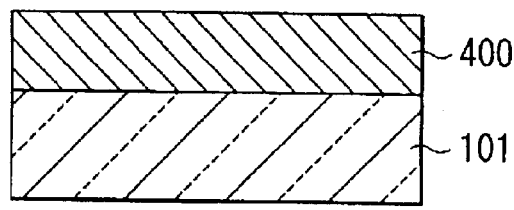
FIGS. 6A to 6E show steps of manufacturing an insulating layer in a liquid crystal display apparatus according to a comparative example 2.
Figure 6B:
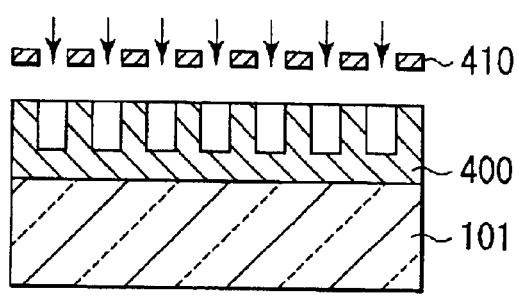
Figure 6C:
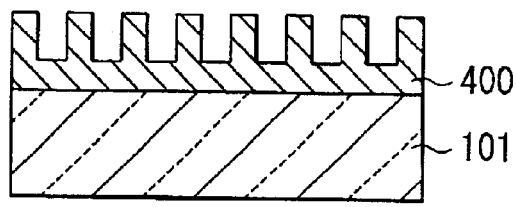
Figure 6D:
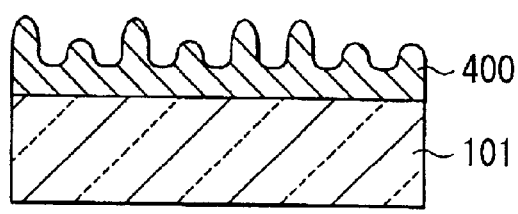
Figure 6E:
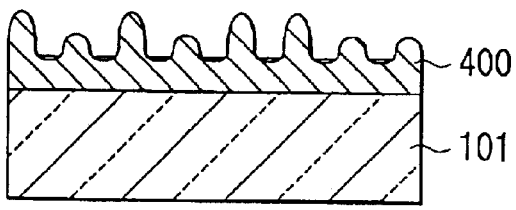

Comparative Example 2 is shown in FIGS. 6A to 6E. An LCD apparatus of Comparative Example 2 has an insulating layer 120 with an uneven shape, which is formed by the process comprising, in succession, a film-forming step, an exposure step, a developing step, a first heating (melt-baking) step and a second heating (post-baking) step. The steps in FIGS. 6A to 6C are identical to the steps in FIGS. 4A to 4C. The step in FIG. 6E is identical to the step in FIG. 4E. In the first heating step in FIG. 6D, the photosensitive resin 400 is heated at a lower temperature than in the second heating step, e.g. about 100° C., thereby curing the photosensitive resin 400 to some extent and fixing the shape.

The performances of these three LCD apparatuses were compared with respect to the range of viewing angles and the ratio of occurrence of non-uniform reflection. FIG. 7 shows experimental results. The same conditions were set for the exposure step (first exposure step), developing step and post-baking step (second heating step).

The range of viewing angles, in this context, is defined as follows. Specifically, the distribution of angles of reflectance is measured when light is made incident on the counter-substrate side of the LCD apparatus in a direction of 30° (the incidence angle to the normal direction of the counter-substrate). When it is assumed that the sum of reflectance at all angles, except for the direction of regular reflection, is 100%, the range of viewing angles is equivalent to the range of 70%. As the range of angles decreases, the reflectance near the direction of regular reflection increases and thus the viewing angle is visually recognized as being narrower. On the other hand, as the range of angles increases, the viewing angle is visually recognized as being wider.

The ratio of occurrence of non-uniform reflectance, in this context, is defined as follows. When a predetermined number of LCD apparatuses of each of the three types are manufactured, this ratio means a ratio of the number of products, which are determined to be defective due to non-uniform reflection, to the total number of products.

As is shown in FIG. 7, the range of angles (i.e. the viewing angle) was 5° and very narrow in Comparative Example 1, wherein only the post-baking step was performed following the developing step, without the melt-baking step or post-exposure step. In Comparative Example 2 wherein the melt-baking step was performed following the developing step, the range of angles was 27°. In the case of the present embodiment wherein the post-exposure step was performed following the developing step, the range of angles was 28° and was wide.

In Comparative Example 2, the ratio of occurrence of non-uniform reflection was 40% and high. By contrast, in the cases of Comparative Example 1 and the present embodiment, the ratio of occurrence of non-uniform reflection was 0% and the occurrence of non-uniform reflection was sufficiently suppressed.

It was confirmed that if the post-exposure step was performed following the developing step, as in the present embodiment, the ratio of occurrence of non-uniform reflection was decreased while the range of viewing angles was increased.

The reasons for these advantages will now be explained. In Comparative Example 1, following the developing step of FIG. 5C, the photosensitive resin 400 is quickly heated at high temperatures in the post-baking step of FIG. 5D. In this case, since the photosensitive resin 400 does not have enough viscosity, it tends to melt excessively. As a result, in the post-baking step, the photosensitive resin 400, as a whole, melts to a great extent, and the difference in height between ridges and troughs of the uneven shape decreases. This leads to a narrower range of viewing angles.

In Comparative Example 2, low-temperature melt-baking is performed to cure the photosensitive resin to some extent and to fix the shape. However, the temperature management range for the photosensitive resin 400 is very narrow. If there is some difference in temperature in the melt-baking, this leads to a difference in amount of melting. In general, heating steps such as melt-baking and post-baking are performed, with a substrate being placed on a hot plate. The hot plate used in this case may have a temperature variance, which exceeds the temperature management range of photosensitive resin 400, depending on locations on the hot plate. The temperature variance in the melt-baking step results in a variation in the uneven surface shape of the photosensitive resin 400.

Consequently, in the post-baking step, the amount of melting of photosensitive resin 400 varies from location to location of the resin 400. The uneven shape at the location with a great amount of melting has a small difference between the ridge and trough. On the other hand, the uneven shape at the location with a small amount of melting has a large difference between the ridge and trough. In this fashion, the height between ridges and troughs of the uneven shape varies depending on locations on the surface of photosensitive resin 400. It is considered that the variance in the uneven shape is a cause of the non-uniform reflection.

As has been explained above, with the manufacturing methods of Comparative Examples 1 and 2, it is difficult to create a desired uneven shape on the surface of photosensitive resin 400. By contrast, in the present embodiment, the post-exposure step is performed following the developing step, whereby the excessively melting of the positive-type photo-sensitive resin 400 can be suppressed in the post-baking step and the degree of unevenness of the surface of photosensitive resin 400 can be controlled.

According to the present embodiment, as described above, the entirety of the photosensitive resin is exposed before the photosensitive resin is heated. Thus, the viscosity of the photosensitive resin at the time prior to heating increases. Therefore, the uneven shape of the photosensitive resin can easily be controlled when the photosensitive resin is heated in the heating step.

Since the desired uneven shape can uniformly be formed in accordance with the predetermined pattern of the photomask, the occurrence of non-uniform reflection can be suppressed and the viewing angle can be increased.

Therefore, an LCD apparatus with excellent display performance and a method of manufacturing the same can be provided.

In the description of the present embodiment, the reflection-type LCD apparatus is exemplified. However, this invention is not limited to the embodiment. For example, the present invention is applicable to display apparatuses with reflection display functions. The invention is also applicable to LCD apparatuses having reflection electrodes formed of semi-transparent metallic material and having transmission display functions and reflection display functions, as well as to LCD apparatuses wherein a transmission electrode for achieving a transmission display function and a reflection electrode for achieving a reflection display function are provided in the same pixel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a liquid crystal display apparatus having a liquid crystal layer between a first substrate and a second substrate and having an uneven layer with an uneven shape on a liquid crystal layer side of the first substrate, wherein said uneven layer is formed by:

a layer-forming step of forming a photosensitive resin layer on the first substrate;

a first exposure step of exposing the photosensitive resin layer through a mask having a predetermined pattern at a first exposure intensity;

a developing step of developing the photosensitive resin layer exposed in the first exposure step;

a second exposure step of exposing an entirety of the developed photosensitive resin layer without a mask at a second exposure intensity, wherein said second exposure intensity is greater than said first exposure intensity; and a heating step of heating the photosensitive resin exposed in the second exposure step.

2. A method according to claim 1, wherein said first substrate includes a switching element and a pixel electrode connected to the switching element, and said uneven layer is an insulating layer serving as an underlayer for the pixel electrode.

3. A method according to claim 2, wherein said pixel electrode is formed of a metallic material that reflects ambient light incident from the second substrate side through the liquid crystal layer.

4. A method according to claim 1, wherein said uneven layer is formed of a positive type photosensitive resin.

* * * * *